(12) United States Patent　　　　(10) Patent No.:　US 12,568,007 B2

Fukumoto et al.　　　　　　　　　　(45) Date of Patent:　　Mar. 3, 2026

(54) EQUALIZATION METHOD, EQUALIZATION DEVICE AND RECEIVING SYSTEM

(71) Applicant: NTT, Inc., Tokyo (JP)

(72) Inventors: Hiroyuki Fukumoto, Musashino (JP); Yosuke Fujino, Musashino (JP); Seiji Omori, Musashino (JP); Yuya Ito, Musashino (JP); Miharu Oiwa, Musashino (JP); Ryota Okumura, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/843,570

(22) PCT Filed: Mar. 11, 2022

(86) PCT No.: PCT/JP2022/011096

§ 371 (c)(1),
(2) Date: Sep. 3, 2024

(87) PCT Pub. No.: WO2023/170968

PCT Pub. Date: Sep. 14, 2023

(65) Prior Publication Data

US 2025/0184192 A1　　　Jun. 5, 2025

(51) Int. Cl.
　　*H04L 27/01*　　　　(2006.01)
(52) U.S. Cl.
　　CPC .................................... *H04L 27/01* (2013.01)
(58) Field of Classification Search
　　CPC ........................................................ H04L 27/01
　　See application file for complete search history.

(56) References Cited

U.S. PATENT DOCUMENTS

2003/0214881 A1* 11/2003 Yang ...................... H04B 11/00
　　　　　　　　　　　　　　　　　　　367/134
2021/0181339 A1* 6/2021 Brumley ............. G01S 7/52003

OTHER PUBLICATIONS

Stojanovic et al., Adaptive multichannel combining and equalization for underwater acoustic communications, The journal of the Acoustical Society of America, vol. 94, No. 3, 1993, pp. 1621-1631 (Year: 1993).*

(Continued)

*Primary Examiner* — Freshteh N Aghdam
(74) *Attorney, Agent, or Firm* — Harness, Dickey & Pierce, P.L.C.

(57)　　　　　　ABSTRACT

A receiving system includes one or more subarrays, a phase rotation unit, an equalization unit, and a calculation unit. The subarray includes a set of a plurality of elements having a strong correlation in a Doppler frequency transition. The phase rotation unit performs, on a reception signal received by each element of the subarray, phase rotation processing of a phase rotation amount calculated for the subarray to which the element that has received the reception signal belongs. The equalization unit performs equalization processing on the reception signal subjected to the phase rotation processing. The calculation unit averages phase amounts of the signals received by the elements belonging to the subarray for each subarray, and calculates the phase rotation amount for performing phase compensation using the averaged phase amount.

8 Claims, 7 Drawing Sheets

(56)                    References Cited

OTHER PUBLICATIONS

M. Stojanovic et al., Adaptive multichannel combining and equal-
ization for underwater acoustic communications, The Journal of the
Acoustical Society of America, vol. 94, No. 3, 1993, p. 1621-1631.
M. Johnson et al., Improved Doppler tracking and correction for
underwater acoustic communications, 1997 IEEE International Con-
ference on Acoustics, Speech, and Signal Processing, 1997, pp.
575-578 vol. 1, doi: 10.1109/ICASSP.1997.599703.
Eynard G et al: "Blind Doppler compensation scheme for single
carrier digital underwater communications", OCEANS 2008, IEEE,
Piscataway, NJ, USA, Sep. 15, 2008, pp. 1-5.
Wang Zhenduo et al: "Mean Doppler Compensation for SIMO
Turbo Equalization in Underwater Acoustic Communications", 2019
IEEE International Conference On Signal Processing, Communi-
cations and Computing (ICSPCC), IEEE, Sep. 20, 2019, pp. 1-6.

\* cited by examiner

|  | RELATED ART | PRESENT EMBODIMENT |
|---|---|---|
| CARRIER FREQUENCY | 100kHz |  |
| ctermninal BANDWIDTH | 100kHz |  |
| MODULATION SCHEME | 8PSK |  |
| TRANSMISSION SCHEME | SINGLE CARRIER |  |
| ERROR CORRECTION | LDPC CODE |  |
| NUMBER OF TRANSMISSION CHANNELS | 1 |  |
| NUMBER OF RECEPTION CHANNELS | 16 (FOUR ELEMENTS/SUBARRAY × FOUR SUBARRAYS) |  |
| FRAME COMPOSITION | TRAINING DATA 1534 SYMBOLS<br>DATA 64800 SYMBOLS |  |
| EQUALIZATION SCHEME | MDFE +<br>PLL UPDATE FORMULA FOR EACH CHANNEL<br>SEPARATELY FOLLOWS FORMULA (3) | MDFE +<br>PLL UPDATE FORMULA FOR EACH SUBARRAY<br>FOLLOWS FORMULA (6) |

Fig. 4

EQUALIZATION METHOD, EQUALIZATION DEVICE AND RECEIVING SYSTEM

CROSS-REFERENCE TO RELATED APPLICATIONS

This application is a 371 U.S. National Phase of International Application No. PCT/JP2022/011096, filed on Mar. 11, 2022. The entire disclosure of the above application is incorporated herein by reference.

TECHNICAL FIELD

The present invention relates to an equalization method, an equalization device and a receiving system.

BACKGROUND ART

In water, absorption and attenuation of radio waves are extremely large, and thus it is difficult to perform wireless communication using radio waves as on land. Therefore, in water, sound waves of 1 MHz or less are often used for wireless communication. Such sound waves have relatively small absorption and attenuation even in water. Wireless communication in water using sound waves is sometimes called underwater acoustic communication. Sound waves have a slow propagation speed. Therefore, a large Doppler shift may occur in sound waves as a terminal moves. Further, the subsea environment is a multipath environment. Therefore, multipath Doppler shift may occur.

In underwater communication that is susceptible to adverse multipath effects, a multi-reception channel adaptive equalizer may be used (see, for example, Non Patent Literature 1 and Non Patent Literature 2). This adaptive equalizer is called a multi-channel decision feedback equalizer (DFE).

This adaptive equalizer includes a finite impulse response (FIR) filter for each reception channel. The adaptive equalizer performs waveform equalization by combining output values obtained by FIR filter calculation for each reception channel across all reception channels. Furthermore, the adaptive equalizer calculates an error between an equalizer output obtained by the above-described equalization processing and a desired signal (or provisional determination value). The adaptive equalizer adaptively controls coefficients of the FIR filter using an adaptive algorithm such as least mean square (LMS) or recursive least square (RLS) on the basis of the error. Accordingly, the adaptive equalizer is caused to follow the variation in multipath strength and the variation in direction of arrival that occur in a data frame.

Further, the adaptive equalizer includes a digital phase-lock loop (DPLL) inside. The adaptive equalizer uses the DPLL to adaptively compensate for Doppler frequency fluctuations caused by external factors such as ship rocking. By performing waveform equalization processing using an FIR filter and carrier frequency offset compensation processing using a DPLL for each symbol, robust waveform equalization that can withstand unique underwater propagation path fluctuations is achieved.

CITATION LIST

Non Patent Literature

Non Patent Literature 1: M. Stojanovic, J. Catipovic, and J. G. Proakis, "Adaptive multichannel combining and equal-
ization for underwater acoustic communications," The Journal of the Acoustical Society of America, vol. 94, no. 3, 1993, p. 1621-1631.
Non Patent Literature 2: M. Johnson, L. Freitag and M. Stojanovic, "Improved Doppler tracking and correction for underwater acoustic communications," 1997 IEEE International Conference on Acoustics, Speech, and Signal Processing, 1997, pp. 575-578 vol. 1, doi: 10.1109/ICASSP.1997.599703.

SUMMARY OF INVENTION

Technical Problem

A DPLL of a conventional multi-channel DFE detects a phase lead amount (or delay amount) on the basis of a comparison between a phase of an output value of an FIR filter included in each reception channel and a phase of a desired signal, and smooths the detected phase amount using a loop filter. Accordingly, Doppler frequency fluctuations of each reception channel are estimated and compensated for by correcting the phase of the reception signal. Since the DPLL is performed completely independently for each reception channel, the DPLL operates without problems even if the Doppler frequency fluctuations of each reception channel are different.

However, in an operating environment where a signal-to-interference-plus-noise ratio (SINR) per reception channel is low, phase detection accuracy is low. In such an operating environment, it is difficult to correctly estimate the Doppler frequency. Operating environments in which the SINR per reception channel is low include, for example, multiple input multiple output (MIMO) transmission, transmission in a case where an input signal to noise ratio (SNR) is low due to a long transmission distance, an environment where there is much external noise such as impulse noise in a case where phase noise is large due to the device, and the like. If the Doppler frequency cannot be estimated correctly, equalizer control will fail and demodulation performance will deteriorate.

In view of the above circumstances, an object of the present invention is to provide an equalization method, an equalization device, and a receiving system capable of improving demodulation performance in an environment where an influence of noise is large.

Solution to Problem

According to one aspect of the present invention, there is provided an equalization method including: a phase rotation step of inputting, from one or more subarrays including a set of the plurality of elements having a strong correlation in a Doppler frequency transition, a signal received by each of the plurality of elements, and performing, on the reception signal, phase rotation processing of a phase rotation amount calculated for the subarray to which the element that has received the reception signal belongs; an equalization step of performing equalization processing on the reception signal subjected to the phase rotation processing; and a calculation step of averaging phase amounts of the signals received by the elements belonging to the subarray for each of the subarrays, and calculating the phase rotation amount for performing phase compensation by the phase rotation processing using the averaged phase amount.

According to one aspect of the present invention, there is provided an equalization device including: a phase rotation unit (hereinafter also referred to as "phase rotation circuitry") configured to input, from one or more subarrays including a set of the plurality of elements having a strong correlation in a Doppler frequency transition, a signal received by each of the plurality of elements, and to perform, on the reception signal, phase rotation processing of a phase rotation amount calculated for the subarray to which the element that has received the reception signal belongs; an equalization unit (hereinafter also referred to as "equalizer") configured to perform equalization processing on the reception signal subjected to the phase rotation processing; and a calculation unit (hereinafter also referred to as "calculator") configured to average phase amounts of the signals received by the elements belonging to the subarray for each of the subarrays, and to calculate the phase rotation amount for performing phase compensation by the phase rotation processing using the averaged phase amount.

According to one aspect of the present invention, there is provided a receiving system including: one or more subarrays including a set of a plurality of elements having a strong correlation in a Doppler frequency transition; a phase rotation unit configured to perform, on a signal received by each of the elements, phase rotation processing of a phase rotation amount calculated for the subarray to which the element that has received the reception signal belongs; an equalization unit configured to perform equalization processing on the reception signal subjected to the phase rotation processing; and a calculation unit configured to average phase amounts of the signals received by the elements belonging to the subarray for each of the subarrays, and to calculate the phase rotation amount for performing phase compensation by the phase rotation processing using the averaged phase amount.

Advantageous Effects of Invention

According to the present invention, it is possible to improve demodulation performance in an environment where the influence of noise is large.

BRIEF DESCRIPTION OF DRAWINGS

FIG. 4 is a diagram illustrating experimental specifications.

DESCRIPTION OF EMBODIMENTS

An embodiment of the present invention will be described in detail below with reference to the drawings. In order to clarify differences between the present embodiment and the related art, first, a device configuration of a conventional multi-channel DFE will be described. Subsequently, an embodiment of the present invention and experimental results will be described.

[Conventional Method]

Figure 7:
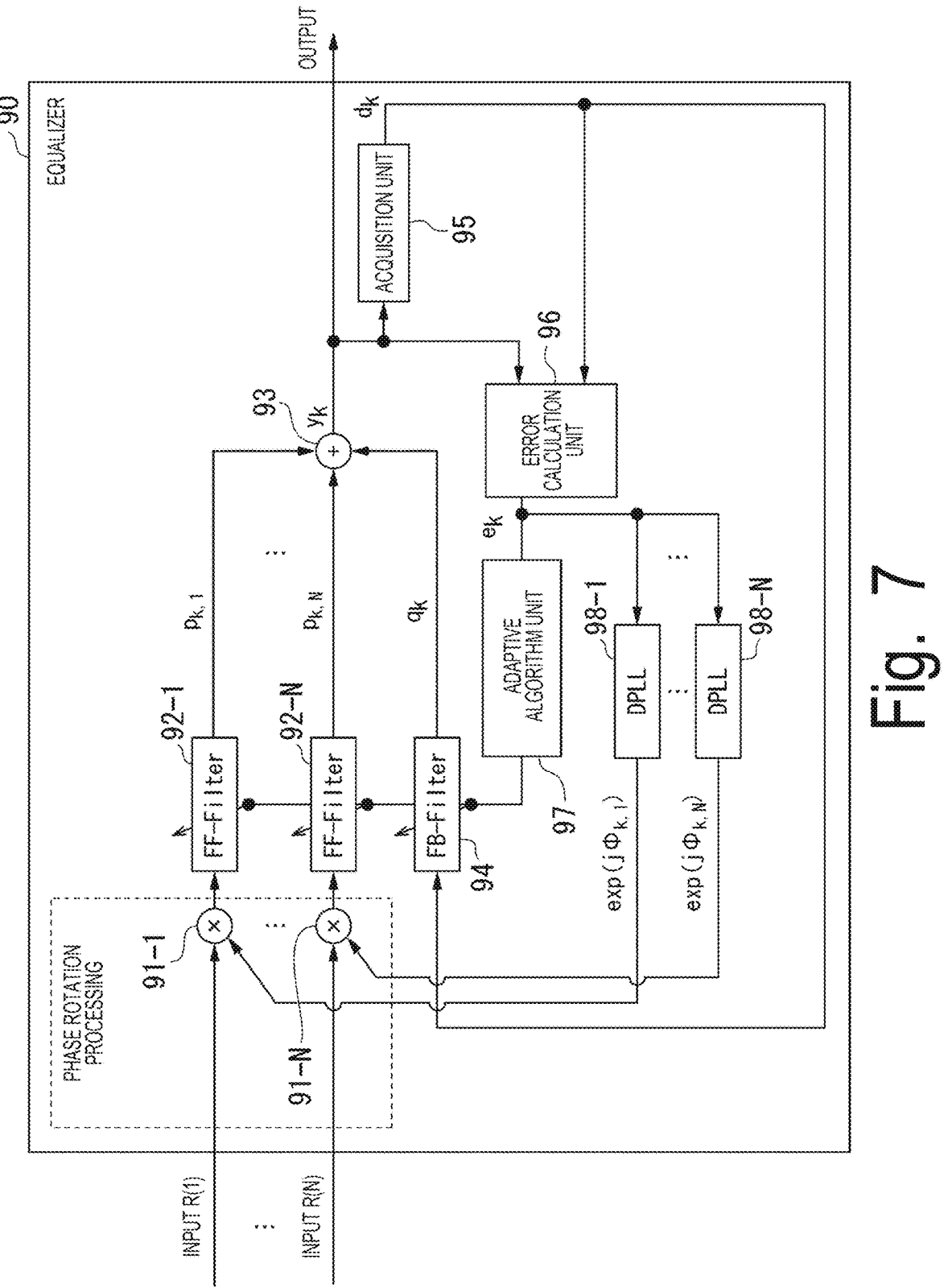
FIG. 7 is a diagram illustrating a configuration of an equalizer in the related art.

FIG. 7 is a diagram illustrating a configuration of an equalizer 90 using the related art. The equalizer 90 is a multi-channel DFE. The number of reception channels of the equalizer 90 is N (N is an integer of 2 or more). The signal input to the equalizer 90 is, for example, a sound wave received by an array of N receivers arranged in a row. The equalizer 90 receives input signals for each channel. An n-th channel is referred to as a channel ch(n), and an input signal of the channel ch(n) is referred to as an input R(n). In the case of the equalizer 90, n is an integer 1 or more and N or less.

The equalizer 90 includes N phase rotation units 91, N feedforward filters (FF-filters) 92, an adder 93, a feedback filter (FB-filter) 94, an acquisition unit 95, an error calculation unit 96, an adaptive algorithm unit 97, and N DPLLs 98. The phase rotation unit 91, the FF-filter 92, and the DPLL 98 corresponding to the channel ch(n) are referred to as a phase rotation unit 91-$n$, an FF-filter 92-$n$, and a DPLL 98-$n$, respectively.

The phase rotation unit 91-$n$ performs phase rotation processing on the input R (n). The FF-filter 92-$n$ performs FF-filter processing on the input R (n) subjected to the phase rotation processing, and outputs a waveform-equalized signal $p_{k,n}$. k is a sample number.

The adder 93 combines signals $p_{k,1}$ to $p_{k,N}$ individually processed for each of channels ch(1) to ch(N). The adder 93 may also combine an output $q_k$ of the FB-filter 94 therewith in addition to the signals $p_{k,1}$ to $p_{k,N}$. This combining is shown by the following Formula (1). The combined signal $y_k$ is an equalizer output.

[Math. 1]

$$y_k = \sum_{n=1}^{N} p_{k,n} + q_k \qquad (1)$$

As described above, n (n=1, . . . , N) in Formula (1) represents a channel number, and the subscript k represents a k-th sample output after the equalizer 90 operates. Hereinafter, all the other variables are used in the same meaning.

Subsequently, the acquisition unit 95 performs symbol determination on the equalizer output $y_k$ or reads out training data stored in advance, thereby obtaining a desired signal $d_k$ corresponding to the equalizer output $y_k$. The equalizer output $y_k$ can also be considered as an estimated value obtained when the desired signal $d_k$ is transmitted. The equalizer 90 outputs an equalizer output $y_k$ for subsequent processing.

Subsequently, the error calculation unit 96 obtains an error signal $e_k$ on the basis of a difference between the equalizer output $y_k$ and the desired signal $d_k$. The adaptive algorithm unit 97 drives the adaptive algorithm on the basis of the error signal $e_k$ to update the filter coefficients of the FF-filters 92-1 to 92-N and the coefficients of the FB-filter 94.

In parallel, the DPLL 98-1 to the DPLL 98-N detect the phase amount of the signal $p_{k,n}$. The phase amount of the signal $p_{k,n}$ is the phase lead amount (or phase delay amount) of the signal $p_{k,n}$ from the desired signal $d_k$. A calculation formula for detecting the phase value, which is the value of the phase amount of the signal $p_{k,n}$, is as follows.

(Calculation Formula of Non Patent Literature 1): Mean Square Error (MSE) Minimum Formula

[Math. 2]

$$g_{k,n} = \text{Im}\{P_{k,n}(e_k + p_{k,n})*\}, n = 1, \dots, N \qquad (2)$$

(Calculation Formula of Non Patent Literature 2): Strict Calculation of Phase Value

[Math. 3]

$$g_{k,n} = \text{Im}\{\log_e\{p_{k,n}(e_k + p_{k,n})*\}\}, n = 1, \dots, N \qquad (3)$$

The DPLL 98-1 to the DPLL 98-N may calculate a phase detection value $g_{k,n}$ of the signal $p_{k,n}$ by applying any one of Formulas (2) and (3). Here, Im represents an imaginary part. In addition, * on the right shoulder indicates a complex conjugate.

Subsequently, the DPLL 98-$n$ applies loop filter processing to the phase detection value $g_{k,n}$ to obtain a phase rotation amount $\exp(j\Phi_{k+1,n})$ of the channel ch(n) in the (k+1)-th repetition. $\Phi_{k+1,n}$ is calculated using the following Formula (4).
(Calculation Formula of Non Patent Literature 1)

[Math. 4]

$$\Phi_{k+1,n} = \Phi_{k,n} + K_1 g_{k,n} + K_2 \sum_{k_0=1}^{k} g_{k_0,n}, n = 1, \dots, N \qquad (4)$$

Here, $K_1$ and $K_2$ are loop filter coefficients of the DPLL 98. As described above, the phase rotation amount $\exp(j\Phi_{k+1,n})$ calculated in each iteration is an estimation amount individually calculated for each channel ch(n). The DPLL 98-$n$ outputs the calculated phase rotation amount $\exp(j\Phi_{k+1,n})$ to the phase rotation unit 91-$n$. The phase rotation unit 91-$n$ gives the phase rotation amount $\exp(j\Phi_{k+1,n})$ to the (k+1)-th sample of the input R(n).
[Principle of Present Embodiment]

Figure 1:
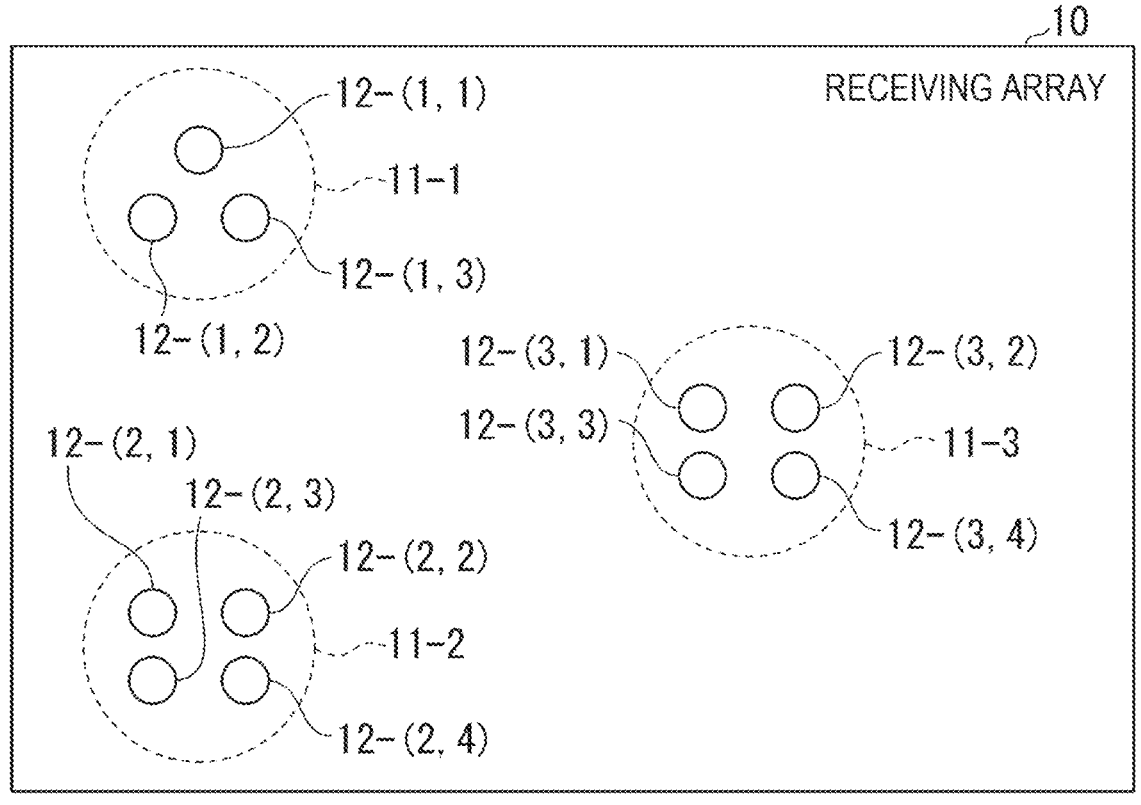
FIG. 1 is a diagram illustrating a configuration of a receiving array according to an embodiment of the present invention.

A physical principle leading to the present embodiment will be described. FIG. 1 is a diagram illustrating a configuration of a receiving array 10 used in an embodiment of the present invention. The receiving array 10 includes one or more subarrays 11. Each subarray 11 includes a set of receivers 12 having two or more elements. Hereinafter, the receiver 12 is also referred to as an element. $N_{sub}$ ($N_{sub}$ is an integer of 1 or more) subarrays 11 included in the receiving array 10 are referred to as subarrays 11-1 to 11-$N_{sub}$, respectively. The $M_n$ receivers 12 arranged in the subarray 11-$n$ are referred to as receivers 12-($n$,1) to 12-($n$,$M_n$), respectively. In the present embodiment, n is an integer of 1 or more and $N_{sub}$ or less. $M_n$ is an integer of 2 or more.

The receiving array 10 illustrated in FIG. 1 includes a subarray 11-1, a subarray 11-2, and a subarray 11-3. The subarray 11-1 includes three elements of receivers 12-(1,1) to 12-(1,3). The subarray 11-2 includes four elements of receivers 12-(2,1) to 12-(2,4). The subarray 11-3 includes four elements of receivers 12-(3,1) to 12-(3,4). Thus, FIG. 1 is an example of $N_{sub}$=3, $M_1$=3, and $M_2$=$M_3$=4.

The receivers 12 constituting the respective subarrays 11 are physically very close to each other. The plurality of receivers 12 constituting the subarray 11 have a strong positive correlation in a Doppler frequency transition. For example, the distance between the plurality of receivers 12 constituting one subarray 11 may be set to be within a threshold value. In this case, the threshold value is determined on the basis of, for example, a distance at which the subarrays 11 have a predetermined or more positive correlation in a Doppler frequency transition. On the other hand, the subarrays 11 are installed at positions separated from each other.

In the arrangement illustrated in FIG. 1, the Doppler frequency fluctuations that occur in each of the different subarrays 11 (for example, the subarray 11-1 and the subarray 11-2) may differ. On the other hand, since the three receivers 12-(1,1) to 12-(1,3) are arranged at positions very physically close to each other in the subarray 11-1, it can be considered that these receivers 12-(1,1) to 12-(1,3) are subjected to the same Doppler frequency fluctuation.

Figure 2:
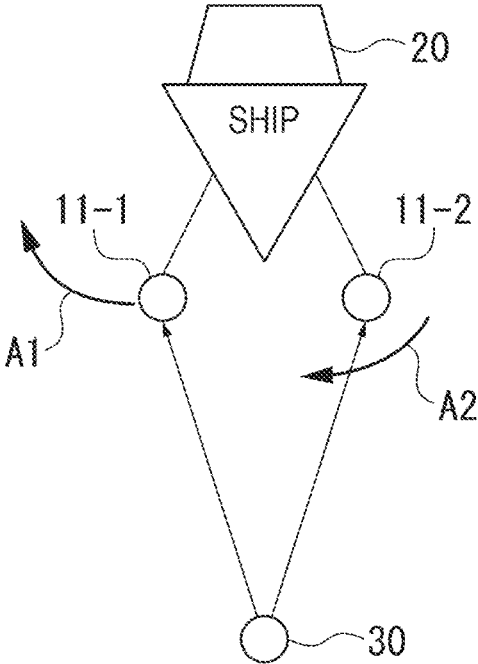
FIG. 2 is a diagram illustrating an installation example of a subarray according to the embodiment.

As a specific application example, a case where subarrays 11 are installed on both sides of a ship is considered. FIG. 2 is a diagram illustrating an installation example of the subarray 11. FIG. 2 illustrates a front view of a ship 20. A subarray 11-1 is installed on one of both sides of the ship 20, and a subarray 11-2 is installed on the other side. Further, a transmitter 30 is installed immediately below the ship 20.

In a case where the ship 20 rolls and moves like a pendulum, the subarray 11-1 moves away from the transmitter 30, as indicated by arrow A1. Therefore, the Doppler frequencies of receivers 12-(1,1) to 12-(1, $M_1$) in the subarray 11-1 uniformly become low. On the other hand, the subarray 11-2 moves to approach the transmitter 30 as indicated by arrow A2. Therefore, the Doppler frequencies of receivers 12-(2,1) to 12-(2, $M_2$) in the subarray 11-2 uniformly become high.

If the phase amount detected for each of the subarrays 11 is averaged and the same DPLL is applied for each of the subarrays 11 using this property, an averaging effect against noise will occur, making it more robust against phase noise.
[Configuration of Equalizer of Present Embodiment]

Figure 3:
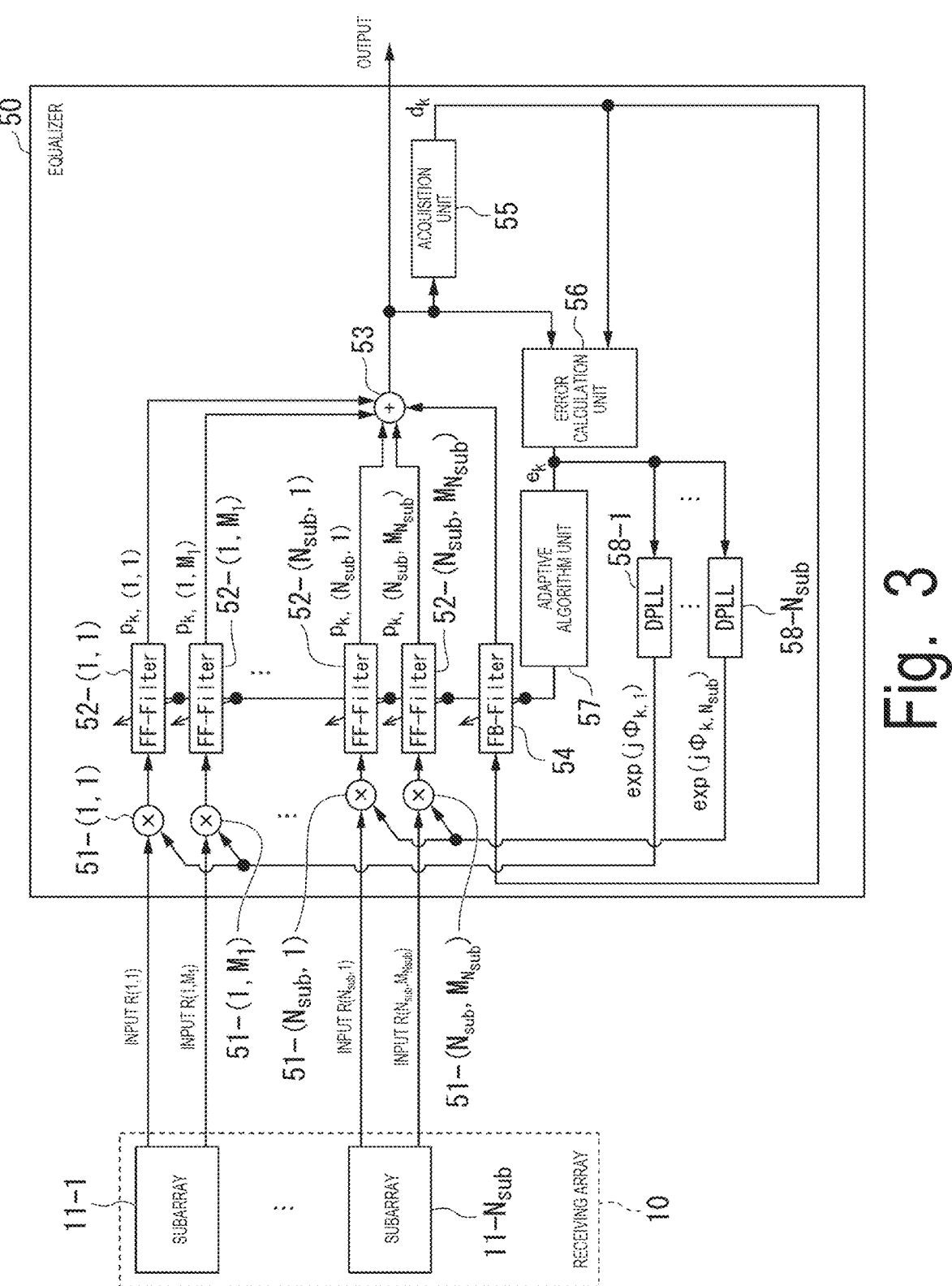
FIG. 3 is a diagram illustrating a configuration of an equalizer according to the embodiment.

FIG. 3 is a diagram illustrating a configuration of an equalizer 50. The receiving system of the present embodiment includes the receiving array 10 illustrated in FIG. 1, an analog-to-digital conversion unit (not illustrated), and an equalizer 50 illustrated in FIG. 3. The analog-to-digital conversion unit converts a signal received by each element of the receiving array 10 from an analog signal to a digital signal and outputs the digital signal to the equalizer 50. The equalizer 50 performs signal equalization by digital filter processing.

The equalizer 50 includes L phase rotation units 51, L FF-filters 52, an adder 53, an FB-filter 54, an acquisition unit 55, an error calculation unit 56, an adaptive algorithm unit 57, and $N_{sub}$ DPLLs 58. L is the total number of elements of the receiving array 10. That is, L is the total number (=$M_1$+ . . . +$M_{N\_sub}$) of the receivers 12 included in each of the subarrays 11-1 to 11-$N_{sub}$. Note that $\alpha\_\beta$ in the subscript represents ap.

The equalizer 50 receives a signal from each of the $N_{sub}$ subarrays 11. As described above, the n-th (in the case of the equalizer 50, n is an integer of 1 or more and $N_{sub}$ or less) subarray 11-$n$ includes $M_n$ receivers 12-($n$,1) to 12-($n$, $M_n$). That is, each subarray 11-$n$ has $M_n$ channels. Here, $M_1$ to $M_{Nsub}$ do not necessarily all have to be the same number. Channels belonging to the receivers 12-($n$,1) to 12-($n$, $M_n$) of the subarray 11-$n$ are referred to as channels ch(n,1) to ch(n, $M_n$), respectively. The input signals of the channels ch(n,1) to ch(n, $M_n$) are referred to as inputs R(n,1) to R(n, $M_n$). The input $R(n,m_n)$ is a signal obtained by converting the signal of the channel $ch(n,m_n)$ received by the receiver $12$-$(n,m_n)$ from an analog signal to a digital signal ($m_n$ is an integer of 1 or more and $M_n$ or less).

The equalizer 50 includes a phase rotation unit 51 and an FF-filter 52 corresponding to each of the receivers $12$-$(n,m_n)$. The phase rotation unit 51 and the FF-filter 52 corresponding to the receiver $12$-$(n,m_n)$ are referred to as a phase rotation unit 51-$(n,m_n)$ and an FF-filter 52-$(n,m_n)$, respectively. The phase rotation unit 51-$(n,m_n)$ performs phase rotation processing on the input $R(n,m_n)$ of the channel $ch(n,m_n)$. The FF-filter 52-$(n,m_n)$ performs FF-filter processing on the k-th sample of the input $R(n,m_n)$ on which the phase rotation processing has been performed, and outputs a signal $p_{k,(n,m\_n)}$.

Furthermore, the equalizer 50 includes $N_{sub}$ DPLLS 58 corresponding to the respective subarrays 11. The DPLL 58 corresponding to the subarray 11-$n$ is referred to as a DPLL 58-$n$. The other components of the equalizer 50 are similar to those of the conventional equalizer 90 illustrated in FIG. 7. That is, the functions of the adder 53, the FB-filter 54, the acquisition unit 55, the error calculation unit 56, and the adaptive algorithm unit 57 are similar to the functions of the adder 93, the FB-filter 94, the acquisition unit 95, the error calculation unit 96, and the adaptive algorithm unit 97 of the equalizer 90. However, the adder 53 combines the signals $p_{k,(1,1)}$ to $p_{k,(Nsub,\ M\_N\_sub)}$ output from the L FF-filters 52-(1,1) to 52-($N_{sub}$, $M_{N\_sub}$). The adder 53 may also combine an output $q_k$ of the FB-filter 54 therewith.

The DPLL 58-$n$ obtains the phase detection value using the sum of the signals $p_{k,(n,1)}$ to $p_{k,(n,\ M\_n)}$ which are the outputs from the FF-filters 52-($n$,1) to 52-($n$, $M_n$) belonging to the subarray 11-$n$. In the case of the MSE minimum reference, the DPLL 58-$n$ calculates the phase detection value $g_{k,n}$ using the following Formula (5).

[Math. 5]

$$g_{k,n} = \text{Im}\left\{ \left( \sum_{m \in Sub\ Array:\ n} p_{k,m} \right) \left( e_k + \sum_{m \in Sub\ Array:\ n} p_{k,m} \right)^* \right\},\ n = 1, \dots, N_{sub} \tag{5}$$

Alternatively, the DPLL 58-$n$ may calculate the phase detection value $g_{k,n}$ using the following Formula (6) obtained by extending the modification of Non Patent Literature 2.

[Math. 6]

$$g_{k,n} = \text{Im}\left\{ \log_e\left[ \left( \sum_{m \in Sub\ Array:\ n} p_{k,m} \right) \left( e_k + \sum_{m \in Sub\ Array:\ n} p_{k,m} \right)^* \right] \right\}, \tag{6}$$
$$n = 1, \dots, N_{sub}$$

Here, "Sub Array: n" in the formula is a set of channel numbers of the receivers $12$-($n$,1) to $12$-($n$, $M_n$) belonging to the subarray 11-$n$. The phase detection value $g_{k,n}$ corresponds to an average of the phase amounts of the received signals by the elements belonging to the subarray 11-$n$.

Alternatively, the DPLL 58-$n$ may calculate the phase detection value $g_{k,n}$ using the following Formula (7) to average the detection phases of the signals $p_{k,(n,1)}$ to $p_{k,(n,\ M\_n)}$.

[Math. 7]

$$g_{k,n} = \sum_{m \in Sub\ Array:\ n} \alpha_m \times \text{Im}\{p_{k,n}(e_k + p_{k,n})^*\},\ n = 1, \dots, N_{sub} \tag{7}$$

Alternatively, the DPLL 58-$n$ may calculate the phase detection value $g_{k,n}$ using the following Formula (8). Formula (8) similarly provides an averaging effect for noise.

[Math 8]

$$g_{k,n} = \sum_{m \in Sub\ Array:\ n} \alpha_m \times \text{Im}\{\log_e p_{k,n}(e_k + p_{k,n})^*\},\ n = 1, \dots, N_{sub} \tag{8}$$

In the above, $\alpha_m$ is an averaging weight. Usually, $\alpha_m = 1/M_n$, but other values may be used. Furthermore, in a case where there is one set of subarrays, Formula (5) becomes the following Formula (9).

[Math. 9]

$$g_{k,n} = \tag{9}$$
$$\text{Im}\left\{ \left( \sum_{m \in Sub\ Array:\ 1} p_{k,m} \right) \left( e_k + \sum_{m \in Sub\ Array:\ 1} p_{k,m} \right)^* \right\} \cong \text{Im}\{y_k(e_k + y_k)^*\} =$$
$$\text{Im}\{y_k \times d_k^*\}$$

In this case, the DPLL 58-$n$ may directly calculate the phase detection value $g_{k,n}$ approximately from the equalizer output $y_k$ and the desired signal $d_k$ using Formula (9). Similarly, Formula (6) becomes the following Formula (10).

[Math. 10]

$$g_{k,n} = \text{Im}\left\{ \log_e\left[ \left( \sum_{m \in Sub\ Array:\ 1} p_{k,m} \right) \left( e_k + \sum_{m \in Sub\ Array:\ 1} p_{k,m} \right)^* \right] \right\}, \tag{10}$$
$$n = 1 \cong \text{Im}\{\log_e\{y_k(e_k + y_k)^*\}\} = \text{Im}\{\log_e(y_k \times d_k^*)\}$$

The DPLL 58-$n$ may directly calculate the phase detection value $g_{k,n}$ approximately from the equalizer output $y_k$ and the desired signal $d_k$ using Formula (10).

The DPLL 58-$n$ gives the same phase rotation amount to all the input channels $ch(n,1)$ to $ch(n, M_n)$ connected to the subarray 11-$n$. That is, the DPLL 58-$n$ outputs the calculated phase rotation amount to the phase rotation units 51-($n$,1) to 51-($n$, $M_n$). The DPLL 58-$n$ obtains the phase rotation amount exp $j\Phi_{k+1,n}$) of the (k+1)-th symbol using $\Phi_{k+1,n}$ calculated by the following Formula (11).

[Math. 11]

$$\Phi_{k+1,n} = \Phi_{k,n} + K_1(n)g_{k,n} + K_2(n)\sum_{k_0=1}^{k} g_{k_0,n},\ n = 1, \dots, N_{sub} \tag{11}$$

Here, $K_1(n)$ and $K_2(n)$ are loop filter coefficients of the DPLL 58-$n$. However, the update formula for giving $\Phi_{k+1,n}$ may be an algorithm that automatically optimizes loop filter coefficients such as a Kalman filter method. The Kalman filter method is described, for example, in Reference Literature 1.

(Reference Literature 1) P. F. Driessen, "DPLL bit synchronizer with rapid acquisition using adaptive Kalman filtering techniques," in IEEE Transactions on Communications, vol. 42, no. 9, pp. 2673-2675 September 1994, doi: 10.1109/26.317406.

Figure 5:
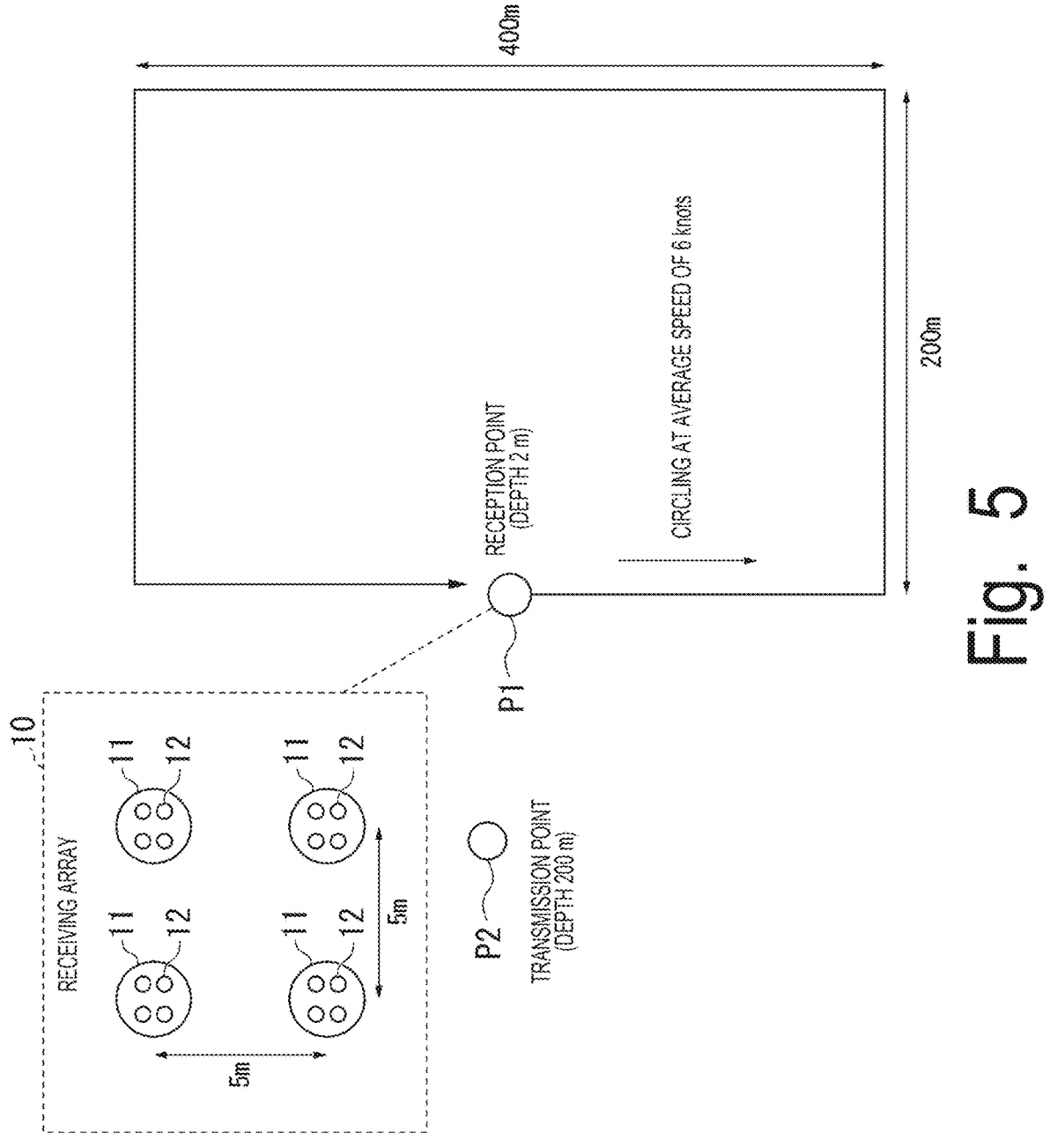
FIG. 5 is a diagram illustrating an experimental system.

In order to demonstrate the effect of the present embodiment, a communication experiment was performed in the sea. FIG. 4 is a diagram illustrating a table describing experimental specifications. This test was performed on the equalizer 90 of the related art and the equalizer 50 of the present embodiment under the same conditions except for performing the DPLL. Furthermore, FIG. 5 is a diagram illustrating an experimental system. As illustrated in FIG. 5, the transmission system was suspended and fixed at a water depth of 200 m. A reception point P1 is a receiving array 10 on a ship. Four subarrays 11 each including a four-element receiver 12 were arranged at 5 m intervals on a ship. That is, a total of 16 elements were arranged. The spacing of the four receivers 12 in each subarray 11 is 5 cm. The reception point P1 was fixedly installed on the ship side to have a water depth of 2 m, and the ship sailed at an average speed of 6 knots on the circling course as illustrated in FIG. 5. The transmission system periodically transmitted packets at 5 seconds intervals from a transmission point P2. The reception point P1 performed reception and collected packets. Reception processing was performed on the collected packet as follows.

The training data series was placed at the beginning of the frame. The filter coefficients were initially converged at sections of the training series. In the subsequent data section, the symbol provisionally determined for each equalization was used, and the adaptive filter was operated to follow the variation of the transmission path. The DPLL was operated in parallel to follow the phase variation. Note that the conventional equalizer 90 was updated using Formula (3) of the scheme according to Non Patent Literature 2, and the configuration of the present embodiment was updated using Formula (6). All processing other than the equalization block, such as synchronization, was the same.

Figure 6:
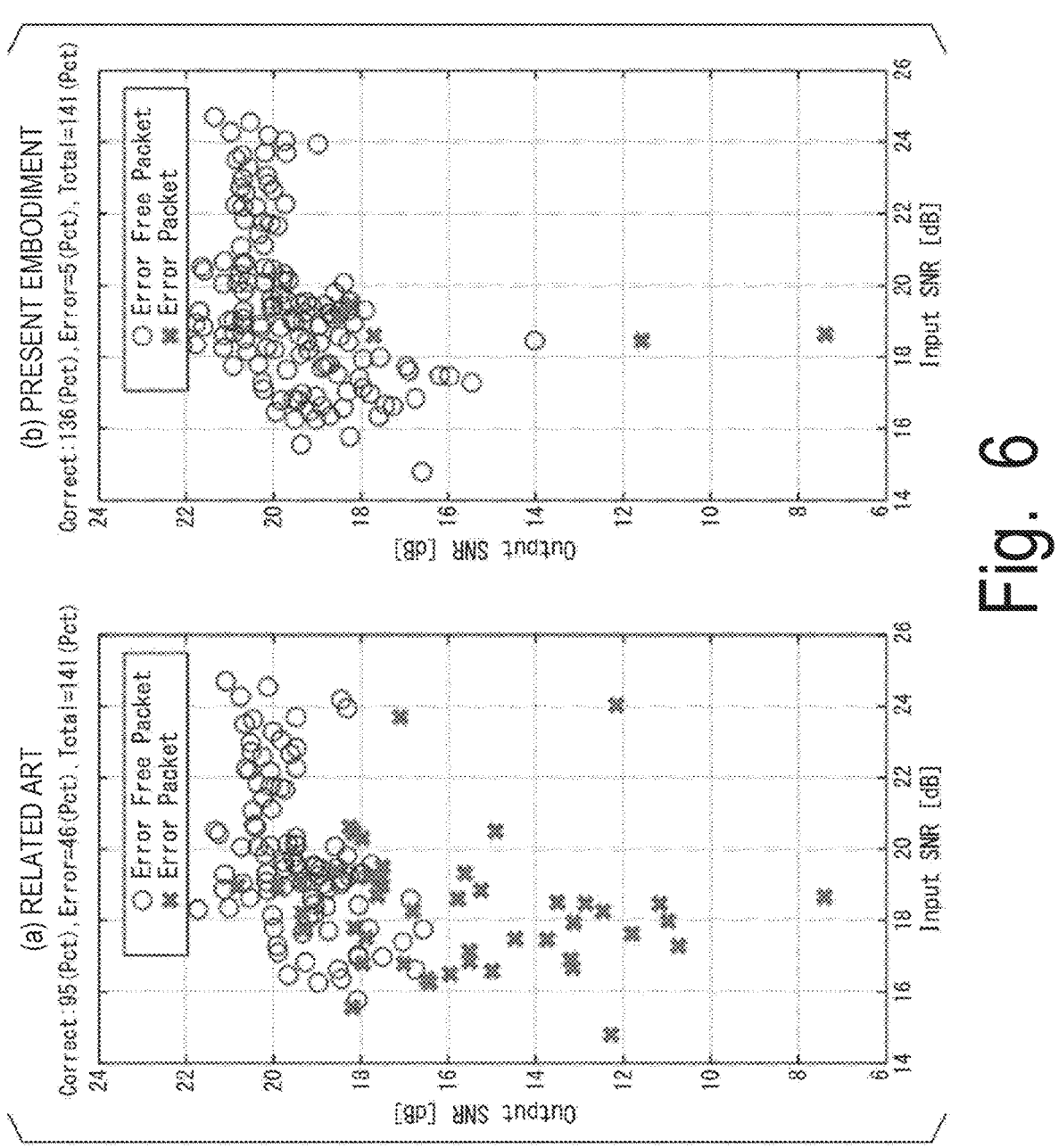
FIG. 6 is a diagram illustrating experimental results.

FIG. 6 is a diagram illustrating experimental results. The horizontal axis represents the input SNR, and the vertical axis represents the SNR at the equalizer output. A circle mark indicates a packet that has been successfully demodulated (error-free packet), and a cross mark indicates a packet that has failed to be demodulated (error packet). FIG. 6($a$) illustrates a result of the equalizer 90 using the DPLL scheme of the related art, and FIG. 6($b$) illustrates a result of the equalizer 50 using the DPLL scheme of the present embodiment.

As illustrated in FIG. 6($a$), in regions where the input SNR is low and the phase noise is considered to be large, errors frequently occur in the equalizer 90 of the related art. On the other hand, as illustrated in FIG. 6($b$), in the equalizer 50 of the present embodiment, the number of error packets is reduced, and the transmission operation is more stable than in the related art. The overall stats are as follows.

(Related Art) Total: 141 packets/error free: 95 packets/error: 46 packets (Present Embodiment) Total: 141 packets/error free: 136 packets/error: 5 packets As described above, the present embodiment was clearly improved as compared with the related art. Therefore, it was shown that the DPLL scheme of the present embodiment is effective.

In the receiving system of the present embodiment described above, a plurality of elements in physically similar environments are grouped into a subarray. The equalizer performs equalization by comparing $d_k$ obtained by combining the desired signal of each channel across all channels with $y_k$ obtained by combining the FIR output of each channel across all channels. The equalizer executes the DPLL algorithm for each subarray using $e_k$ which is a result of phase comparison between $d_k$ and $y_k$. That is, the equalizer performs phase compensation for each subarray. Accordingly, since the noise is averaged and canceled, the phase compensation accuracy is improved, and further, the demodulation performance is improved. According to the present embodiment, it is possible to provide a multi-channel DFE including a DPLL that improves phase detection accuracy of the DPLL and operates more stably than before even in a low SNR environment.

Note that an analog PLL can be used instead of the DPLL. Specifically, the equalizer converts a phase detection value obtained by performing phase detection by comparison between the symbol determination value and the equalizer output into an analog amount, and feeds back the analog amount to an analog PLL device. An analog PLL device performs similar processing to the above-described DPLL.

According to the above-described embodiment, the receiving system includes a receiving array and an equalization device. The receiving array has one or more subarrays. Each subarray includes a set of a plurality of elements having a strong positive correlation in a Doppler frequency transition. A set of a plurality of elements having a strong correlation in a Doppler frequency transition is, for example, a set of a plurality of elements which are close together. The equalization device is, for example, the equalizer 50 of the embodiment. The equalization device includes a phase rotation unit, an equalization unit, and a calculation unit. The phase rotation unit performs, on a reception signal received by each element of the receiving array, phase rotation processing of a phase rotation amount calculated for the subarray to which an element that has received the reception signal belongs. The equalization unit performs equalization processing on the reception signal subjected to the phase rotation processing. The equalization unit is, for example, the FF-filter 52 of the embodiment. The calculation unit averages phase amounts of the signals received by the elements belonging to the subarray for each subarray, and calculates the phase rotation amount for performing phase compensation by the phase rotation processing using the averaged phase amount. The calculation unit is, for example, the error calculation unit 56 and the DPLL 58 of the embodiment.

The calculation unit may apply loop filter processing to the phase amount to calculate the phase rotation amount for each subarray.

The calculation unit may perform comparison processing of comparing a composite signal obtained by combining all the reception signals after the equalization processing with a desired signal, phase amount calculation processing of calculating an averaged phase amount on the basis of a comparison result of the comparison processing and a result of summing the reception signals after the equalization processing of each of the elements belonging to the subarray for each subarray, and phase rotation amount calculation processing of smoothing the averaged phase amount of each of a plurality of symbols to calculate the phase rotation amount for each subarray. The phase amount calculation processing is, for example, Formulas (5) and (6) of the embodiment, and the phase rotation amount calculation processing is, for example, Formula (11) of the embodiment.

The calculation unit may perform comparison processing of comparing a composite signal obtained by combining all the reception signals after the equalization processing with a desired signal, phase amount calculation processing of averaging phase amounts obtained on the basis of a comparison result of the comparison processing and the reception signals after the equalization processing of the respective elements belonging to the subarray for each subarray, and phase rotation amount calculation processing of smoothing the averaged phase amount of each of a plurality of symbols to calculate the phase rotation amount for each subarray. The phase amount calculation processing is, for example, Formulas (7) and (8) of the embodiment, and the phase rotation amount calculation processing is, for example, Formula (11) of the embodiment.

In a case where there is one subarray, the calculation unit may perform phase amount calculation processing of calculating an averaged phase amount on the basis of multiplication of a composite signal obtained by combining all the reception signals after the equalization processing by a complex conjugate of a desired signal, and phase rotation amount calculation processing of smoothing the averaged phase amount of each of a plurality of symbols to calculate the phase rotation amount. The phase amount calculation processing is, for example, Formulas (9) and (10) of the embodiment, and the phase rotation amount calculation processing is, for example, Formula (11) of the embodiment.

Although the embodiments of the present invention have been described in detail with reference to the drawings, specific configurations are not limited to the embodiments, and include design and the like within the scope of the present invention without departing from the gist of the present invention.

REFERENCE SIGNS LIST

10 Receiving array
11, 11-1 to 11-3, 11-N$_{sub}$ Subarray
12, 12-(1,1) to 12-(1,3), 12-(2,1) to 12-(2,4), 12-(3,1) to 12-(3,4) Receiver
20 Ship
30 Transmitter
50, 90 Equalizer
51-(1,1) to 51-(N$_{sub}$, M$_{N\_sub}$) Phase rotation unit
52-(1,1) to 51-(N$_{sub}$, M$_{N\_sub}$) FF-filter
53 Adder
54 FB-filter
55 Acquisition unit
56 Error calculation unit
57 Adaptive algorithm unit
58-1 to 58-N$_{sub}$ DPLL
90 Equalizer
91-1 to 91-N Phase rotation unit
92-1 to 92-N FF-filter
93 Adder
94 FB-filter
95 Acquisition unit
96 Error calculation unit
97 Adaptive algorithm unit

The invention claimed is:
1. An equalization method comprising:
inputting, from one or more subarrays including a set of the plurality of elements having a strong correlation in a Doppler frequency transition, received signals each received by each of the plurality of elements, and performing, on each of the received signals as a reception signal, phase rotation processing of a phase rotation amount calculated for one of the subarrays to which one of the plurality of elements that has received the reception signal belongs;
performing equalization processing on the reception signal subjected to the phase rotation processing; and
performing calculation processing of averaging phase amounts of the received signals each having been received by each of the plurality of elements belonging to same of the subarrays to calculate averaged phase amount for each of the subarrays, and of calculating the phase rotation amount for performing phase compensation by the phase rotation processing using the averaged phase amount for each of the subarrays.
2. The equalization method according to claim 1, wherein the calculation processing includes applying loop filter processing to the averaged phase amount to calculate the phase rotation amount for each of the subarrays.
3. The equalization method according to claim 1, wherein the calculation processing includes performing (i) comparison processing of comparing a composite signal obtained by combining all the received signals which have been performed the equalization processing with a desired signal, (ii) phase amount calculation processing of calculating the averaged phase amount on the basis of a comparison result of the comparison processing and a result of summing the received signals which have been received by the plurality of elements belonging to the same of the subarrays and have been performed the equalization processing for each of the subarrays, and (iii) phase rotation amount calculation processing of smoothing the averaged phase amount of each of a plurality of symbols to calculate the phase rotation amount for each of the subarrays.
4. The equalization method according to claim 1, wherein the calculation processing includes performing (i) comparison processing of comparing a composite signal obtained by combining all the received signals which have been performed the equalization processing with a desired signal, (ii) phase amount calculation processing of averaging phase amounts obtained on the basis of a comparison result of the comparison processing and the received signals which have been received by the plurality of elements belonging to the same of the subarrays and have been performed the equalization processing for each of the subarrays, and (iii) phase rotation amount calculation processing of smoothing the averaged phase amount of each of a plurality of symbols to calculate the phase rotation amount for each of the subarrays.
5. The equalization method according to claim 1, wherein, in a case where there is one subarray, the calculation processing includes performing phase amount calculation processing of calculating the averaged phase amount on the basis of multiplication of a composite signal obtained by combining all the received signals after the equalization processing by a complex conjugate of a desired signal, and phase rotation amount calculation processing of smoothing the averaged phase amount of each of a plurality of symbols to calculate the phase rotation amount.
6. The equalization method according to claim 1, wherein the set of the plurality of elements having a strong correlation in a Doppler frequency transition is a set of a plurality of the elements which are close together.
7. An equalization device comprising:
a phase rotation circuitry configured to input, from one or more subarrays including a set of the plurality of elements having a strong correlation in a Doppler frequency transition, received signals each received by each of the plurality of elements, and to perform, on each of the received signals as a reception signal, phase rotation processing of a phase rotation amount calculated for one of the subarrays to which one of the plurality of elements that has received the reception signal belongs;

an equalizer configured to perform equalization processing on the reception signal subjected to the phase rotation processing; and a calculator configured to average phase amounts of the received signals each having been received by each of the plurality of elements belonging to same of the subarrays to calculate averaged phase amount for each of the subarrays, and to calculate the phase rotation amount for performing phase compensation by the phase rotation processing using the averaged phase amount for each of the subarrays.

8. A receiving system comprising:

one or more subarrays including a set of a plurality of elements having a strong correlation in a Doppler frequency transition;

a phase rotation circuitry configured to perform, on each of received signals received by the plurality of elements as a reception signal, phase rotation processing of a phase rotation amount calculated for one of the subarrays to which one of the plurality of elements that has received the reception signal belongs;

an equalizer configured to perform equalization processing on the reception signal subjected to the phase rotation processing; and a calculator configured to average phase amounts of the received signals each having been received by each of the plurality of elements belonging to same of the subarrays to calculate averaged phase amount for each of the subarrays, and to calculate the phase rotation amount for performing phase compensation by the phase rotation processing using the averaged phase amount for each of the subarrays.

* * * * *